United States Patent Office
3,113,935
Patented Dec. 10, 1963

3,113,935
PROCESS TO MANUFACTURE COPOLYMERS OF OMEGA-AMINOALKYL UREA WITH METHYLENE RADICALS HAVING DIFFERENT NUMBER OF CARBONS
Yanosuke Inaba and Koji Kimoto, Fujisawa City, Japan, assignors to Toyo Koatsu Industries, Incorporated, Tokyo, Japan, a corporation of Japan
No Drawing. Filed Nov. 19, 1959, Ser. No. 854,002
Claims priority, application Japan Dec. 1, 1958
5 Claims. (Cl. 260—77.5)

The present invention relates generally to an improved method for the production of synthetic organic thermoplastic materials and it relates particularly to an improved method for the production of polyurea copolymers.

In copending application Serial No. 844,865, filed October 7, 1959, in the name of Inaba et al. there is described a novel process for the production of polyurea resins of improved properties. These polyurea resins were copolymers produced by the condensation polymerization reaction effected between urea and two or more alkylenediamines of six or more carbons or their carbonates. The resulting polyurea copolymer resins were far superior to those previously provided from the single alkylenediamine. They had lower melting points than those of the corresponding polyureas of the individual alkylenediamine while having substantially the same decomposition temperature, thus greatly facilitating the melt-spinning of the resin. Furthermore, the polyurea copolymers were far superior to the conventionally-produced polyurea in physical and chemical properties. It had a lower crystallinity and hence less brittleness, permitting the production of better film and moulded products. Fibres produced therefrom dyed many times faster than those produced from the conventional polyurea resin, were more resistant to light and had an excellent Young's modulus.

A principal object of the present invention is to provide an improved method of producing polyurea resins.

Another object of the present invention is to provide an improved method of producing polyurea copolymers of the above characteristics.

Still another object of the present invention is to provide an improved method of producing polyurea copolymers characterized by its economy, simplicity and ease of control.

According to the present invention a polyurea copolymer resin of superior properties capable of being readily melt-spun into excellent fibres is produced by reacting at a condensation polymerization temperature two or more omega-aminoalkyleneureas having different alkylene radicals or their carbonates having the general formula:

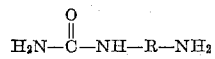

wherein R is an alkylene radical of from 6 to 12 carbon atoms. The alkylene radicals are preferably linear and should contain different numbers of carbons. The reaction is effected either in the absence of a solvent or in the presence of water or phenolic type solvent and in an inert gaseous atmosphere such as a relatively pure nitrogen. As the reaction proceeds ammonia is released, and the rate of evolution of ammonia is most vigorous at a temperature of 170° C. to 180° C. In raising the temperature and continuing the reaction to completion, the polymerization is completed and the polyurea copolymer resin is produced. The final stage of the process is carried out under reduced pressure in order to completely distill off the unreacted low-boiling point, low molecular weight products whereby a molten mass is obtained which possesses excellent spinning characteristics. The omega-aminoalkylene ureas employed as the starting material may be prepared in suitably pure form from nitrourea in the well-known manner or other known processes may be employed to produce the omega-aminoalkylene ureas.

Since, as in the case of the production of polyurea by other processes, the polyurea copolymer obtained by the present process has a tendency towards depolymerization by dissociation of the isocyanate radical and amino radical through the dearrangement of urea at high temperatures, it is necessary to prevent such depolymerization by changing the form of the terminating radical to that of other than urea. For this purpose a small amount of an alkyl monoamide or an N-acylalkyldiamine is introduced as a stabilizer into the reaction system. The alkyl radical or acyl radical of the alkylmonoamide or N-acyl-alkyldiamine should have at least three and preferably six or more carbons.

The polyurea copolymers produced by the present process are similar to those produced by the process described in the above-identified co-pending patent application of Inaba et al. An important feature of the present process, however, is the absence of free urea in the reaction system. As a consequence, depolymerization or branching reactions due to the dissociation of isocyanic acid by the dearrangement of urea at the high temperatures does not occur since the free urea which effects such reactions is not present. A result is that the polyurea copolymer resin produced by the present process possesses a highly uniform molecular weight distribution and hence excellent spinning properties. As compared with the conventional polyurea produced from a single alkylenediamine, it has a lower melting point and lower crystallinity, thereby facilitating its spinning into fibres and its extrusion and moulding. Furthermore, the fibres spun therefrom are superior in dyeing characteristics, strength, elongation, Young's modulus, crimp stability and other chemical and physical properties.

This application is a continuation-in-part of Inaba et al., U.S. Patent 2,973,342, issued on application Serial No. 765,308, filed October 6, 1958.

The following examples, in which the parts are given by weight, are illustrative of the present invention:

*Example 1*

A mixture of 67 parts of omega-amino nonamethylene urea, 125 parts of omega-amino octamethylene urea and 2.6 parts of palmitic acid amide was placed in an airtight vessel having an inert atmosphere of substantially pure nitrogen. The mixture was agitated and heated to a temperature of between 115° C. and 120° C. until it reached a uniform homogeneous liquid state with the slow evolution of ammonia. After about one hour at the above temperature, the temperature was slowly raised to 250° C. in the presence of the inert atmosphere until the liquid assumed a viscous state, large quantities of ammonia being released at temperatures between 170° C. and 180° C. After heating for one to two hours at 250° C., the reaction was continued under reduced pressure and there is obtained a light yellow, transparent molten mass which may be readily spun into fibres. The polyurea copolymer resin forming the molten mass had a melting point of 225° C. to 230° C., an intrinsic viscosity in m-cresol of 0.7 to 0.9. The fibres melt-spun from the resin had a tenacity of 4.0 to 5.0 grams per denier, a Young's modulus of 350 to 450 kg./mm.², excellent crimp stability, good dyeing speed and characteristics and other superior physical and chemical properties.

*Example 2*

111 parts of omega-amino octamethylene urea carbonate, 108 parts of omega-amino hexamethylene urea carbonate and 1.6 parts pelargonic acid amide were dissolved in 43 parts of water at a temperature of 115° C. to 120° C. under pressure. After continuing the reaction in this state for two to three hours the pressure on water vapour and ammonia present was reduced, and the vessel was kept in an inert atmosphere such as substantially pure nitrogen while gradually raising the temperature to 250° C., during which time the water vapour and ammonia are released and the mass reaches a viscous state. The reaction was completed at 250° C. under reduced pressure to produce a molten polyurea copolymer resin readily spinnable into fibres. The resulting polyurea copolymer had a melting point of 220° C. to 225° C., an intrinsic viscosity in m-cresol of 0.7 to 0.9 and excellent melt-spinning properties. The other properties were similar to those of the polyurea copolymer produced in accordance with Example 1.

Example 3

82 parts of omega-amino nonamethylene urea carbonate, 63 parts of omega-amino octamethylene urea and 2.6 parts of N-caproyl-nonamethylene-diamine were dissolved in three times their weight of metacresol, heated for two to three hours at 120° C., and the temperature was then slowly raised to 250° C. The reaction was effected in the presence of substantially pure nitrogen and ammonia was released and the solvent distilled off, the condensate product assuming a viscous state. After reacting for about an hour at 250° C. and completely distilling off the solvent under reduced pressure, the reaction is completed to produce a molten polyurea copolymer which could be readily spun into fibres. The melting point of the resulting polyurea copolymer was 220° C. to 230° C. and its other physical and chemical properties and those of the fibres melt-spun therefrom were similar to those of the polyurea copolymer and fibres of Example 2.

As many apparently widely different embodiments of this invention may be made without departing from the spirit and scope thereof, it is to be understood that the present invention is not limited to the specific embodiments thereof except as defined in the appended claims. For example, other omega-aminoalkyleneureas may be employed than those set forth in the above examples, such as omega-amino ureas of decamethylene, dodecamethylene, heptamethylene, and other polymethylene radicals of at least six carbons.

What is claimed is:
1. The method of producing a polyurea copolymer capable of being readily melt-spun into fibers comprising reacting together at least two different members of the group consisting of omega-aminoalkylene mono-ureas having the general formula

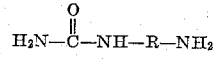

wherein R is a linear alkylene group having from 6 to 12 carbon atoms inclusive, in an inert atmosphere at a temperature between 115° C. and 120° C., with the evolution of ammonia and subsequently raising the temperature to about 250° C. to produce a polyurea copolymer.

2. The method according to claim 1 wherein the reaction is effected in the presence of a stabilizing agent selected from the group consisting of palmitic acid amide, pelargonic acid amide and N-caproyl-nonamethylenediamine.

3. The method according to claim 1 wherein the reaction is effected in the presence of a solvent selected from the group consisting of water and meta-cresol.

4. The method according to claim 2 wherein said members are omega-amino nonamethylene urea and omega-amino-octamethylene urea and the stabilizing agent is palmitic acid amide.

5. The method according to claim 2 wherein said members are omega-amino nonamethylene urea and omega-amino octamethylene urea and the stabilizing agent is N-caproyl-nonamethylenediamine.

References Cited in the file of this patent
UNITED STATES PATENTS

| | | |
|---|---|---|
| 2,816,879 | Wittbecker | Dec. 17, 1957 |
| 2,973,342 | Inaba | Feb. 28, 1961 |

FOREIGN PATENTS

| | | |
|---|---|---|
| 873,709 | France | July 8, 1941 |